United States Patent
Lee

(10) Patent No.: US 10,216,578 B2
(45) Date of Patent: Feb. 26, 2019

(54) DATA STORAGE DEVICE FOR INCREASING LIFETIME AND RAID SYSTEM INCLUDING THE SAME

(71) Applicant: SAMSUNG ELECTRONICS CO., LTD., Suwon-si, Gyeonggi-do (KR)

(72) Inventor: Ju Pyung Lee, Incheon (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 168 days.

(21) Appl. No.: 15/285,588

(22) Filed: Oct. 5, 2016

(65) Prior Publication Data
US 2017/0242752 A1    Aug. 24, 2017

(30) Foreign Application Priority Data
Feb. 24, 2016   (KR) .................. 10-2016-0022158

(51) Int. Cl.
| | |
|---|---|
| G06F 11/00 | (2006.01) |
| G06F 11/10 | (2006.01) |
| G06F 3/06  | (2006.01) |
| G06F 11/16 | (2006.01) |
| G06F 12/02 | (2006.01) |

(52) U.S. Cl.
CPC .......... *G06F 11/1076* (2013.01); *G06F 3/065* (2013.01); *G06F 3/0616* (2013.01); *G06F 3/0659* (2013.01); *G06F 3/0689* (2013.01); *G06F 11/1666* (2013.01); *G06F 12/0253* (2013.01); *G06F 2212/702* (2013.01)

(58) Field of Classification Search
CPC .................. G06F 11/1076; G06F 11/1666
See application file for complete search history.

(56) References Cited

U.S. PATENT DOCUMENTS

| | | |
|---|---|---|
| 5,960,169 A    | 9/1999  | Styczinski |
| 6,742,081 B2   | 5/2004  | Talagala et al. |
| 7,055,058 B2   | 5/2006  | Lee et al. |
| 7,058,762 B2   | 6/2006  | Patterson et al. |
| 8,151,082 B2*  | 4/2012  | Flynn .................... G06F 3/0613 711/202 |
| 8,527,698 B2   | 9/2013  | Bert |
| 8,713,268 B2   | 4/2014  | Dillow et al. |
| 8,775,868 B2   | 7/2014  | Colgrove et al. |
| 8,904,261 B2   | 12/2014 | Cideciyan et al. |
| 2005/0114598 A1* | 5/2005 | Hartung ............... G06F 3/0625 711/114 |
| 2009/0287956 A1 | 11/2009 | Flynn et al. |

(Continued)

*Primary Examiner* — Bryce P Bonzo
*Assistant Examiner* — Katherine Lin
(74) *Attorney, Agent, or Firm* — Volentine, Whitt & Francos, PLLC

(57) ABSTRACT

A data storage device includes a nonvolatile memory arranged in drives and stripes, a buffer storing state information for each of the stripes, and a memory controller including a redundant array of independent disks (RAID) controller that operates in a spare region mode and performs data recovery using garbage collection based on the state information. The state information includes a first state indicating that none of the drives has malfunctioned, a second state indicating one of the drives has malfunctioned, and a third state indicating that data/parity stored in a malfunctioning drive has been recovered.

15 Claims, 20 Drawing Sheets

(56) References Cited

U.S. PATENT DOCUMENTS

| | | | |
|---|---|---|---|
| 2011/0202722 A1* | 8/2011 | Satran | G06F 11/1076 |
| | | | 711/114 |
| 2013/0219214 A1 | 8/2013 | Samanta et al. | |
| 2013/0346720 A1 | 12/2013 | Colgrove et al. | |
| 2014/0215147 A1 | 7/2014 | Pan | |
| 2014/0325262 A1 | 10/2014 | Cooper et al. | |

* cited by examiner

FIG. 6A

|  | SSD1 | SSD2 | SSD3 | SSD4 | SSD5 | SSD6 | SI |
|---|---|---|---|---|---|---|---|
| STP1 | 1 | 2 | 3 | P1 | R | 4 | CL |
| STP2 | 5 | 6 | 7 | 8 | P2 | R | CL |
| STP3 | R | 9 | 10 | 11 | 12 | P3 | CL |
| STP4 | P4 | R | 13 | 14 | 15 | 16 | CL |
| STP5 | 17 | P5 | R | 18 | 19 | 20 | CL |
| STP6 | 21 | 22 | P6 | R | 23 | 24 | CL |

FIG. 6B

| | SSD1 | SSD2 | SSD3 | SSD4 | SSD5 | SSD6 | | SI |
|---|---|---|---|---|---|---|---|---|
| STP1 | 1 | 2 | 3 | P1 | R | 4 | | FL3 |
| STP2 | 5 | 6 | 7 | 8 | P2 | R | | FL3 |
| STP3 | R | 9 | 10 | 11 | 12 | P3 | | FL3 |
| STP4 | P4 | R | 13 | 14 | 15 | 16 | | FL3 |
| STP5 | 17 | P5 | R | 18 | 19 | 20 | | FL3 |
| STP6 | 21 | 22 | P6 | R | 23 | 24 | | FL3 |

FIG. 6D

|  | SSD1 | SSD2 | SSD3 | SSD4 | SSD5 | SSD6 | | SI |
|---|---|---|---|---|---|---|---|---|
| STP1 | 1 | 2 | R | P1 | 3 | 4 | | RB3 |
| STP2 | 5 | 6 | R | 8 | P2 | 7 | | RB3 |
| STP3 | 10 | 9 | R | 11 | 12 | P3 | | RB3 |
| STP4 | P4 | 13 | R | 14 | 15 | 16 | | RB3 |
| STP5 | 17 | P5 | R | 18 | 19 | 20 | | CL |
| STP6 | 21 | 22 | R | P6 | 23 | 24 | | RB3 |

FIG. 6E

| | SSD1 | SSD2 | SSD3 | SSD4 | SSD5 | SSD6 | | SI |
|---|---|---|---|---|---|---|---|---|
| STP1 | 1 | 2 | 3 | P1 | R | 4 | | CL |
| STP2 | 5 | 6 | R | 8 | P2 | 7 | | RB3 |
| STP3 | 10 | 9 | R | 11 | 12 | P3 | | RB3 |
| STP4 | P4 | 13 | R | 14 | 15 | 16 | | RB3 |
| STP5 | 17 | P5 | R | 18 | 19 | 20 | | CL |
| STP6 | 21 | 22 | R | P6 | 23 | 24 | | RB3 |

|  | SSD1 | SSD2 | SSD3 | SSD4 | SSD5 | SSD6 | | SI |
|---|---|---|---|---|---|---|---|---|
| STP1 | 1 | 2 | 3 | P1 | R | 4 | | CL |
| STP2 | 5 | 6 | 7 | 8 | P2 | R | | CL |
| STP3 | R | 9 | 10 | 11 | 12 | P3 | | CL |
| STP4 | P4 | R | 13 | 14 | 15 | 16 | | CL |
| STP5 | 17 | P5 | R | 18 | 19 | 20 | | CL |
| STP6 | 21 | 22 | P6 | R | 23 | 24 | | CL |

Figure 7B:
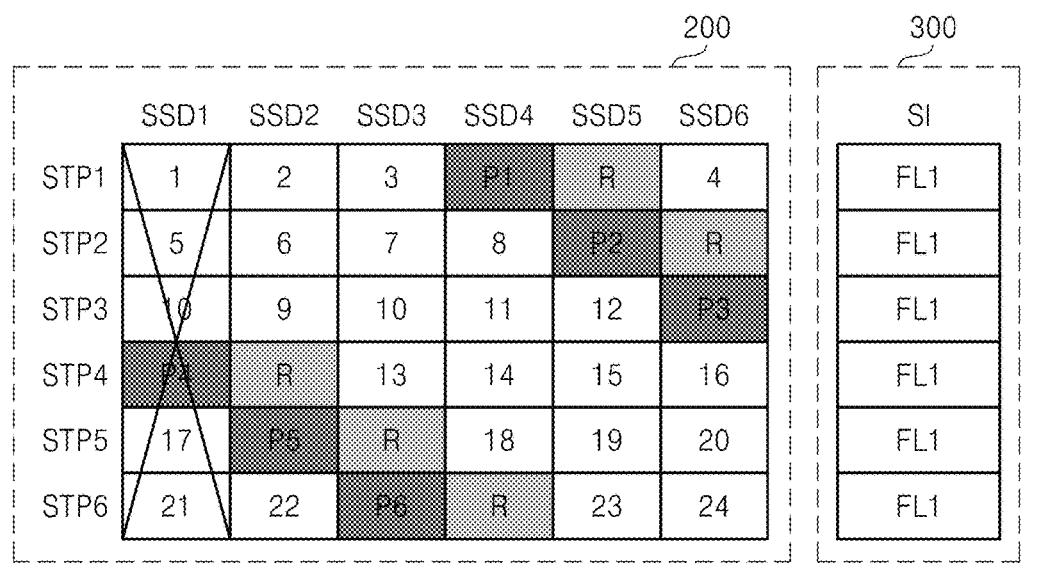

| | SSD1 | SSD2 | SSD3 | SSD4 | SSD5 | SSD6 | | SI |
|---|---|---|---|---|---|---|---|---|
| STP1 | 1 | 2 | 3 | P1 | R | 4 | | FL1 |
| STP2 | 5 | 6 | 7 | 8 | P2 | R | | FL1 |
| STP3 | 10 | 9 | 10 | 11 | 12 | P3 | | FL1 |
| STP4 | | R | 13 | 14 | 15 | 16 | | FL1 |
| STP5 | 17 | P5 | R | 18 | 19 | 20 | | FL1 |
| STP6 | 21 | 22 | P6 | R | 23 | 24 | | FL1 |

FIG. 8

|      | SSD1 | SSD2 | SSD3 | SSD4 | SSD5 | SSD6 |
|------|------|------|------|------|------|------|
| STP1 | 1    | R    | 3    | P1   | 2    | 4    |
| STP2 | 5    | R    | 7    | 8    | P2   | 6    |
| STP3 | 9    | R    | 10   | 11   | 12   | P3   |
| STP4 | P4   | R    | 13   | 14   | 15   | 16   |
| STP5 | 17   | R    | P5   | 18   | 19   | 20   |
| STP6 | 21   | R    | P6   | 22   | 23   | 24   |

| SI  |
|-----|
| RB2 |
| RB2 |
| RB2 |
| RB2 |
| RB2 |
| RB2 |

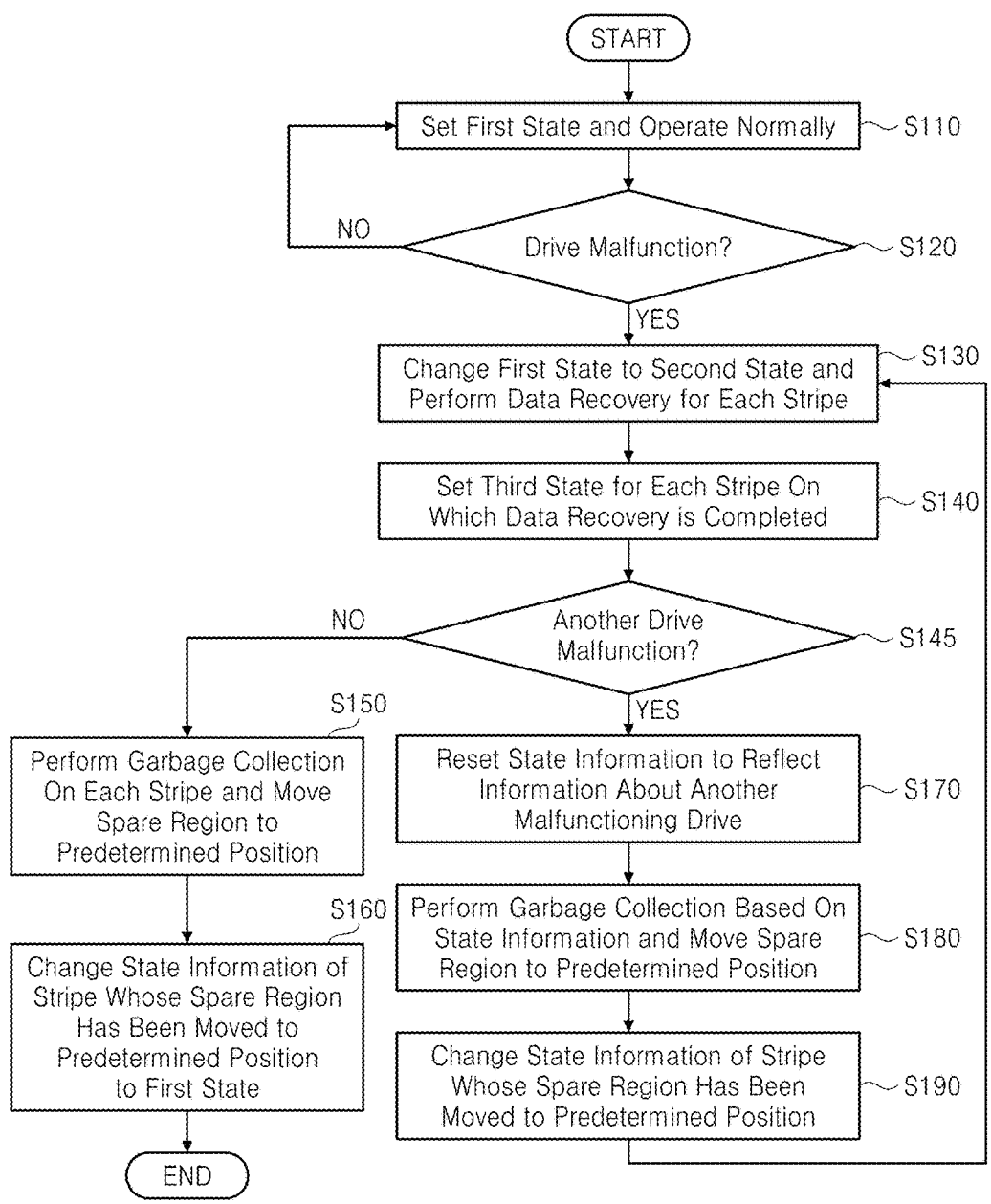

DATA STORAGE DEVICE FOR INCREASING LIFETIME AND RAID SYSTEM INCLUDING THE SAME

CROSS-REFERENCE TO RELATED APPLICATIONS

This application claims priority under 35 U.S.C. § 119(a) from Korean Patent Application No. 10-2016-0022158 filed on Feb. 24, 2016, the subject matter of which is hereby incorporated by reference.

BACKGROUND

Embodiments of the inventive concept relate to data storage devices and redundant array of independent disks (RAID) systems. More particularly, the inventive concept relates to data storage devices having lifetimes extended by a reduction in data movement occurring during data recovery, as well as RAID systems including same.

The term "RAID" generally refers to a field of technology used to prevent data loss in circumstances where one or more constituent data storage devices in a system (e.g., a server) malfunction. Approaches implementing a RAID may vary but generally include a mirror RAID and a parity RAID. A parity RAID is able to recover data errantly stored by a data storage device using corresponding parity data.

Certain servers implemented with a RAID are characterized by a balancing of input/output (I/O) across data storage devices. This I/O load balancing improves overall performance of a server.

SUMMARY

According to some embodiments of the inventive concept, there is provided a data storage device including; a nonvolatile memory arranged according to drives and stripes, a buffer configured to store state information for each of the stripes, and a memory controller comprising a redundant array of independent disks (RAID) controller operating in a spare region mode and configured to perform data recovery using garbage collection based on the state information. The state information indicates at least one of a first state indicating that none of the drives has malfunctioned, a second state indicating that a first drive among the drives has malfunctioned, and a third state indicating that data/parity stored in the first drive has been recovered.

According to some embodiments of the inventive concept, there is provided a redundant array of independent disks (RAID) system including; a data storage device, and a host configured to communicate with the data storage device. The data storage device includes; a nonvolatile memory arranged according to stripes and drives, a buffer configured to store state information of each of the stripes, and a memory controller comprising a redundant array of independent disks (RAID) controller configured to operating in a spare region mode and perform data recovery using garbage collection based on the state information. The state information includes a first state indicating that none of the drives has malfunctioned, a second state indicating one drive among the drives has malfunctioned, and a third state indicating that data/parity stored in the first drive has been recovered.

According to some embodiments of the inventive concept, there is provided a method of operating a data storage device including a nonvolatile memory arranged according to stripes and drives, a buffer storing state information for each of the stripes, and a memory controller including a redundant array of independent disks (RAID) controller operating in a spare region mode and performing data recovery using garbage collection based on the state information. The method includes; setting state information for each of the stripes to a first state indicating none of the drives has malfunctioned, upon determining that one drive among the drives has malfunctioned, changing state information for each of the stripes from the first state to a second state indicating that a drive among the drives has malfunctioned, and recovering data/parity of the one drive using spare regions distributed across the other drives among the drives and changing the state information for each of the stripes from the second state to a third state indicating that the data/parity of the one drive has been recovered.

BRIEF DESCRIPTION OF THE DRAWINGS

The above and other features and advantages of the inventive concept will become more apparent upon consideration of certain embodiments thereof with reference to the attached drawings in which:

FIGS. 6A, 6B, 6C, 6D, 6E and 6F are respective block diagrams illustrating the operation of a data storage device according to some embodiments of the inventive concept;

FIGS. 7A and 7B are respective block diagrams illustrating the operation of a data storage device according to other embodiments of the inventive concept;

FIG. 8 is a block diagram illustrating the operation of a data storage device according to further embodiments of the inventive concept; and FIG. 9 is a flowchart of a method of operating a data storage device according to some embodiments of the inventive concept.

DETAILED DESCRIPTION

The inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Throughout the written description and drawings like reference numbers and labels are used to denote like or similar elements.

Certain embodiments of the inventive concept relate to a redundant array of independent disks (RAID) parity, and more particularly, to a log-structured RAID. In a case where a data storage device uses a typical parity RAID, a single write operation expansively involves two read operations and two write operations every time new data is written. To overcome this problem, a log-structured RAID is used. However, the log-structured RAID requires a separate mapping table and periodic garbage collection.

When one solid state drive (SSD) malfunctions in a log-structured RAID, a spare disk or a spare region may be used for data recovery. Here, a first operating mode associated with use of a spare region (hereafter, "spare region mode") is more complex than a second operating mode associated with the use of a spare disk (hereafter, "spare disk mode"). However, the spare region mode better utilizes SSD resources by allowing all SSDs to participate (or cooperate) in read/write operations and recovery operations.

When data recovery is performed in the spare region mode, a newly-replaced drive is defined as a spare disk, and therefore, the spare region mode may be maintained or it may effectively transition into the spare disk mode, depending on data recovery requirements. The former case is more efficient than the latter case since all SSD resources are used in the former case, but the former case involves more data movement than the latter case since empty pages of the spare disk must be distributed across a plurality of drives. Accordingly, an approach for reducing data movement when data is recovered in a log-structured RAID that operates during data recovery in a spare region mode is desired.

Figure 1:
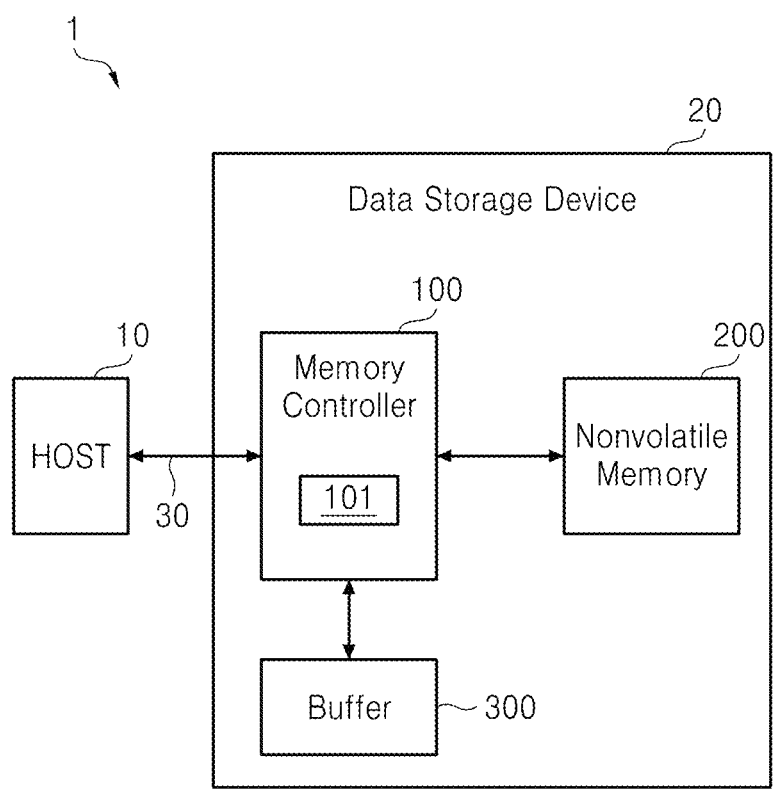
FIG. 1 is a block diagram of a redundant array of independent disks (RAID) system according to some embodiments of the inventive concept.

FIG. 1 is a block diagram of a RAID system 1 according to some embodiments of the inventive concept. The RAID system 1 comprises a host 10, a data storage device 20, and an interface 30, where the RAID system 1 may be used as a memory system. The RAID system 1 may be implemented as a personal computer (PC), a workstation, a data center, an internet data center (IDC), a storage area network (SAN), a network attached storage (NAS), or a mobile computing device, but the inventive concept is not restricted to these examples. The mobile computing device may be implemented as a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, or an e-book.

The host 10 may control a data processing operation (e.g., a write operation or a read operation) of the data storage device 20. The host 10 may be (or include) a host controller. Thus, the host 10 may transmit a write request including write data (and a corresponding write address) to be written to the data storage device 20. The host 10 may also transmit a read request including a read address identifying read data to be retrieved from the data storage device 20. The write request and read request are respective commands.

The host 10 may communicate data with the data storage device 20 through the interface 30. The host 10 may be implemented as an integrated circuit (IC), a motherboard, a system on chip (SoC), an application processor (AP), a mobile AP, a web server, a data server, or a database server, but the inventive concept is not restricted to these examples.

The interface 30 may be implemented as a serial advanced technology attachment (SATA) interface, a SATA express (SATAe) interface, a SAS (serial attached small computer system interface (SCSI)), a peripheral component interconnect express (PCIe) interface, a nonvolatile memory express (NVMe) interface, an advanced host controller interface (AHCI), or a multimedia card (MMC) interface, but the inventive concept is not restricted to these examples. The interface 30 may transmit electrical signals or optical signals.

The data storage device 20 may communicate commands and/or data with the host 10 through the interface 30. The data storage device 20 may be implemented as a flash-based memory device, but the inventive concept is not restricted thereto. For instance, the data storage device 20 may be implemented as a solid-state drive or solid-state disk (SSD), an embedded SSD (eSSD), a universal flash storage (UFS), an MMC, an embedded MMC (eMMC), or a managed NAND, but the inventive concept is not restricted to these examples. The flash-based memory device may be a NAND-type flash memory device or a NOR-type flash memory device.

The data storage device 20 may include one or more memory cell arrays configured in a two-dimensional structure or a three-dimensional structure. Here, a three-dimensional memory cell array may be monolithically formed from one or more physical levels including memory cells having an active region disposed on or above a silicon substrate and may include a circuit involved in the operation of the memory cells. The circuit may be formed in, on or above the silicon substrate. The term "monolithic" means that layers at each level in an array are directly deposited on layers at an underlying level in the array. The three-dimensional memory cell array may include a vertical NAND string which is vertically oriented so that at least one memory cell is placed on or above another memory cell. The at least one memory cell may include a charge trap layer.

Certain aspects of three-dimensional memory cell arrays that may be used in certain embodiments of the inventive concept are described, for example, U.S. Pat. Nos. 7,679,133; 8,553,466; 8,654,587; 8,559,235; and published U.S. Patent Application No. 2011/0233648, the collective subject matter of which is hereby incorporated by reference.

However dimensionally implemented, the memory cell array will include a vast plurality of memory cells, certain memory cells are single-level memory cells (SLC) configured and/or operated to store a single bit of information (e.g., a logical '1' or logical '0') or a multi-level memory cell (MLC) configured and/or operated to store more than 1 bit of information.

The data storage device 20 may also be implemented as a hard disk drive (HDD), a phase-change random access memory (PRAM) device, a magneto-resistive RAM (MRAM) device, a spin-transfer torque MRAM (STT-MRAM) device, a ferroelectric RAM (FRAM) device, or a resistive RAM (RRAM) device, but the inventive concept is not restricted to these examples. The data storage device 20 may include a memory controller 100, a nonvolatile memory 200, and a buffer 300.

The memory controller 100 may be used to control the operation of the nonvolatile memory 200. The memory controller 100 may be implemented as an IC, a SoC, a processor, an AP, a chipset, or a group of semiconductor chips. The memory controller 100 may control transmission or processing of commands and/or data transferred between the host 10 and the nonvolatile memory 200.

The memory controller 100 may be implemented as a RAID controller card. In this case, a RAID controller 101 included in the memory controller 100 implemented as a hardware RAID controller. With this configuration, the host 10 communicates with and controls the operation of the memory controller 100. Alternatively, the memory controller 100 may include a central processing unit (CPU) or a processor. In this case, the RAID controller 101 may be implemented as a software RAID controller running on (or executed by) the CPU or the processor. The hardware or software RAID controller may control the operation of the nonvolatile memory 200. Whether hardware and/or software implemented, the RAID controller will hereafter be generically referred to as the RAID controller 101.

The RAID controller 101 and the nonvolatile memory 200 may communicate commands and/or data using SATA or PCIe.

Each of data storage component (e.g., nonvolatile memory 200 and buffer 300) of the data storage device 20 may be respectively implemented as an HDD or a SSD. Accordingly, certain embodiments of the inventive concept may variously implement HDD-based data storage devices, SSD-based data storage systems and hybrid RAID systems including both HDD and SSD. However, in what follows, certain SSD-based embodiments are described, but the inventive concept is not restricted to only SSD-based data storage systems.

In the illustrated embodiment of FIG. 1, the buffer 300 may be implemented as a volatile memory device including random access memory (RAM), dynamic RAM (DRAM), static RAM (SRAM), buffer memory, cache, and tightly coupled memory (TCM) or as a nonvolatile memory device including NAND flash memory, but the inventive concept is not restricted to these examples. The buffer 300 may include a first memory region used to store a mapping table facilitating logical address-to-physical address translations with respect to the nonvolatile memory 200, a second memory region functioning as a cache, and a third memory region used to store state information corresponding to each of a plurality of stripes, but the inventive concept is not restricted to only this particular buffer configuration. In this regard and in certain embodiments of the inventive concept, a flash translation layer (FTL) may perform logical address-to-physical address translation using the mapping table stored in the first memory region.

Figure 2:
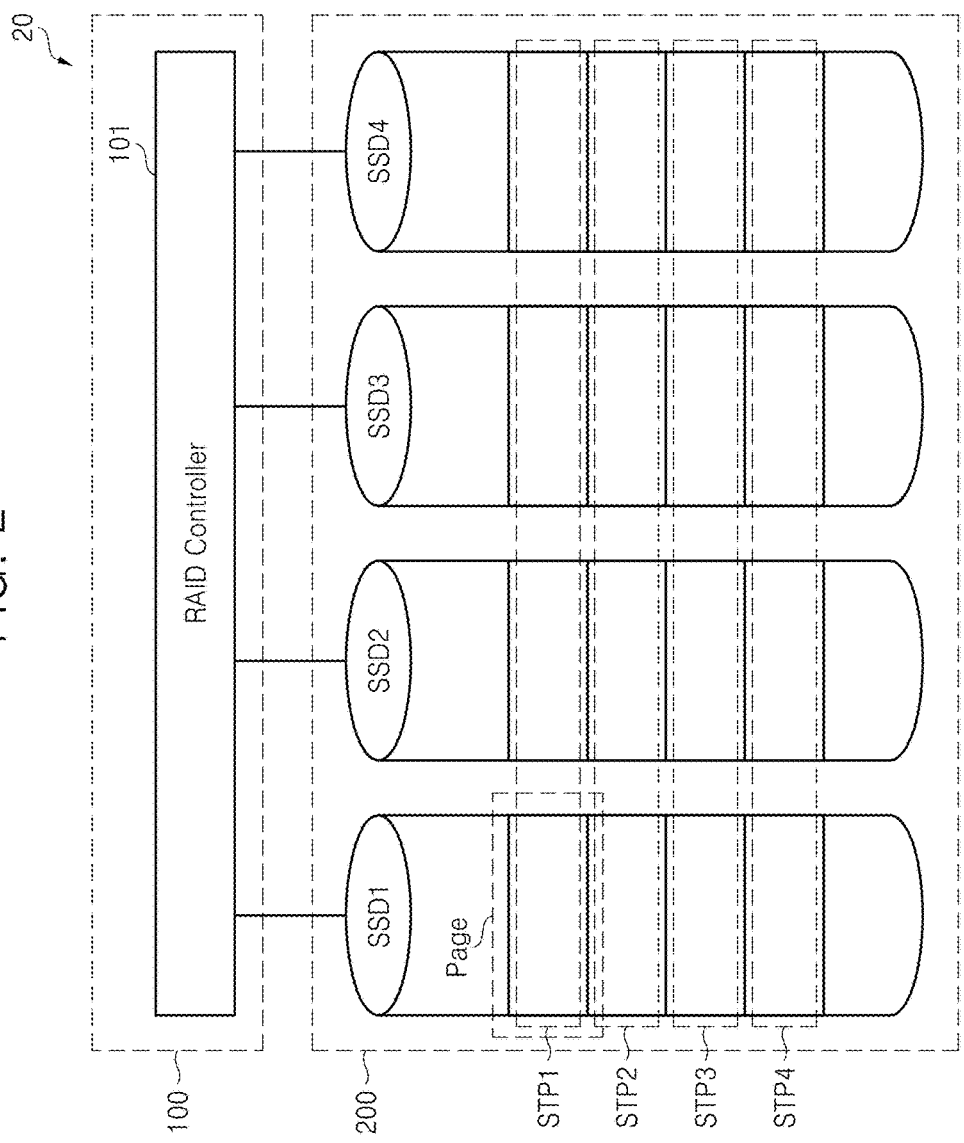
FIG. 2 is a block diagram of a data storage device according to some embodiments of the inventive concept.

FIG. 2 is a block diagram of the data storage device 20 of FIG. 1 according to some embodiments of the inventive concept. Referring to FIGS. 1 and 2, the memory controller 100 includes the RAID controller 101, and the nonvolatile memory 200 includes a plurality of drives, SSD1 through SSD4. The RAID controller 101 may be used to control the drives SSD1 through SSD4. Although the nonvolatile memory 200 includes four drives SSD1 through SSD4 in the illustrated example of FIG. 2, the inventive concept is not restricted to this example.

Each of the drives SSD1 through SSD4 is assumed to include multiple pages, where a "page" is a base unit upon which at least a read operation is performed. Data and/or parity information (hereafter, "parity") may be stored in each page.

The nonvolatile memory 200 is further assumed to be configured according to a plurality of stripes STP1 through STP4. Here, a "stripe" is defined as a base unit on which a RAID recovery operation is performed. A stripe may include a plurality of pages used to generate parity.

Figure 3A:
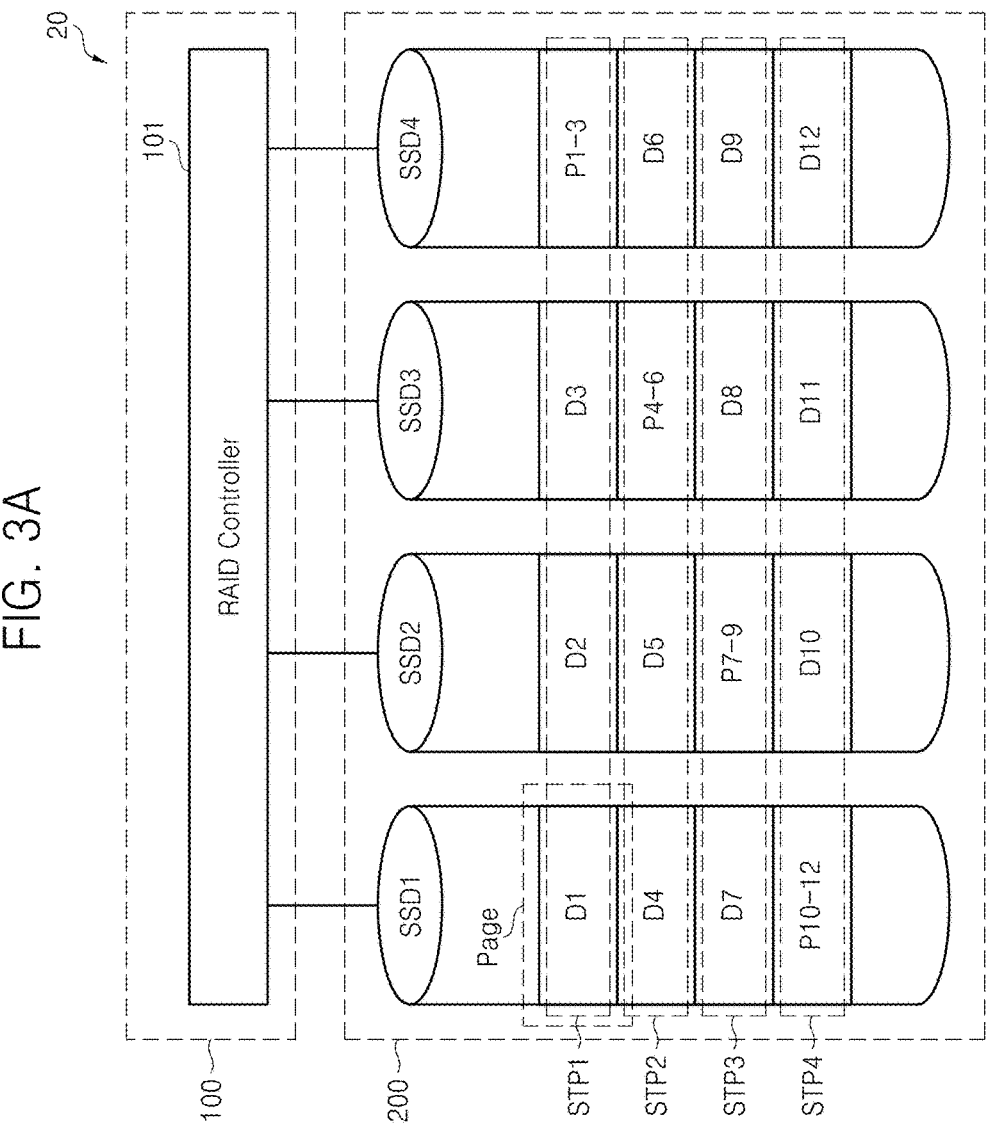
FIG. 3A is a block diagram of a data storage device in a comparative example.

FIG. 3A is a block diagram illustrating another comparative example for the data storage device 20 of FIG. 2. The following description will emphasize differences between the example of FIG. 2

Referring to FIG. 3A, the first stripe STP1 may include pages that store data D1, D2 and D3 used to derive (or generate) first parity P1-3, where the first stripe STP1 includes at least one page that stores the first parity P1-3. The pages used to generate the first parity P1-3 may be first pages disposed across the respective first through fourth drives SSD1 through SSD4. The first parity P1-3 may be generated, for example, by performing an XOR operation on data D1, D2 and D3 stored respectively in the first pages of the respective first through third drives SSD1 through SSD3.

Thus, assuming data D1 is lost, the RAID controller 101 may perform an XOR operation on data D2, data D3 and first parity P1-3 respectively stored in the first pages of the second through fourth drives, SSD2 through SSD4, to recover data D1. The above-described approach may be applied to parity/data stored in any page of any drive. Accordingly, data may be recovered in the event that a drive among the plurality of drives, SSD1 through SSD4, fails or when data stored by one or more of the drives is lost.

For instance, it is assumed that the second drive SSD2 is lost. To recover data D2, the RAID controller 101 may perform an XOR operation on data D1, data D3 and parity P1-3 respectively stored in the first pages of the first, third and fourth drives SSD1, SSD3, and SSD4, to recover data D2. In the same manner, the RAID controller 101 may be used to recover data D5, data D10 and parity P7-9, also stored by the second drive SSD2. In other words, any data or parity stored in relation to a particular stripe may be recovered (e.g.) by performing an XOR operation on other stripe-related (or stripe associated) data stored in relation to the same stripe.

A parity-based RAID of the type illustrated in FIG. 2 perform a single write operation by executing two read operations and two write operations. As a result, problems of deterioration of the performance of a device and accelerated wear of the memory cells of constituent SSD device(s) may occur. These problems are referred to as read-modify-write problems.

Figure 3B:
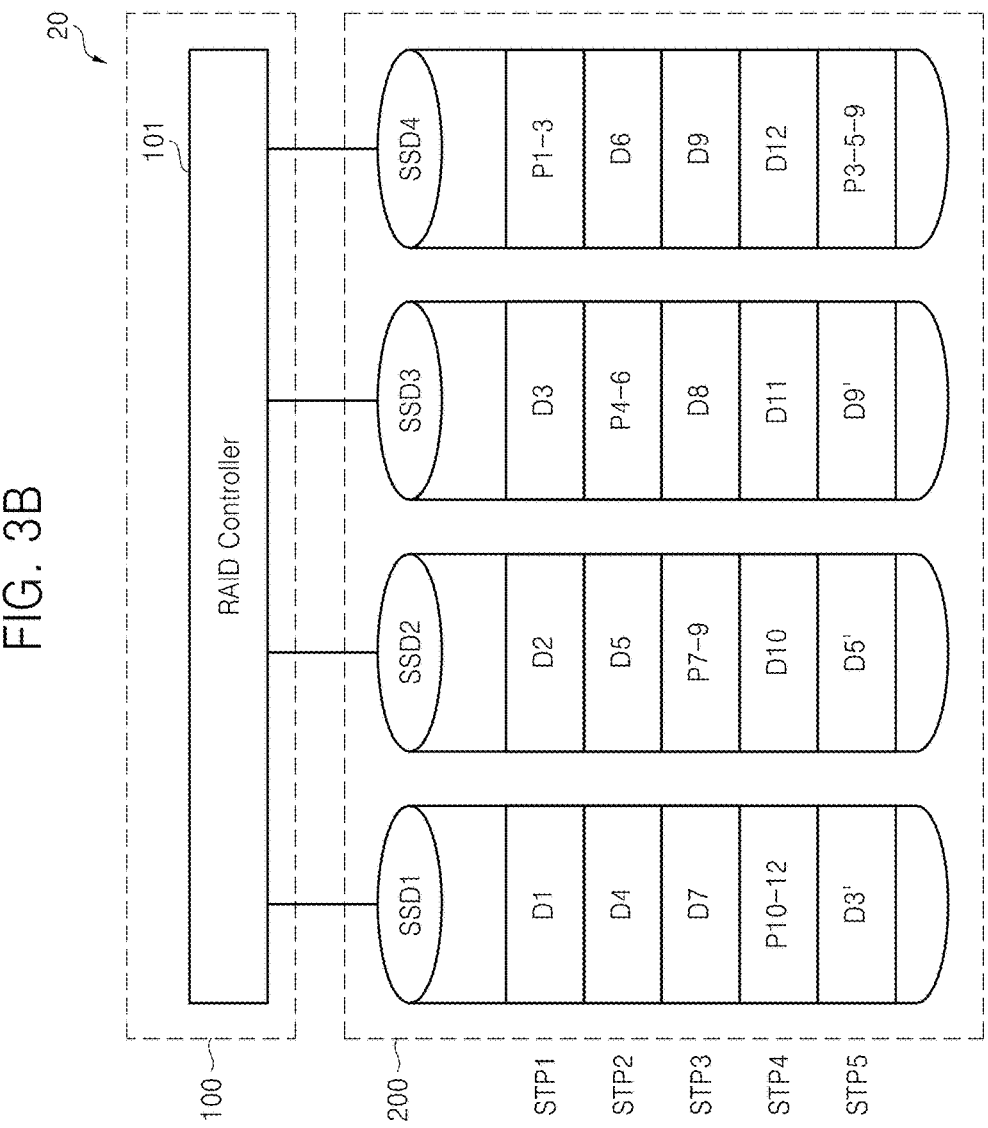
FIG. 3B is a block diagram of a data storage device in another comparative example.

FIG. 3B is a block diagram illustrating another comparative example for the data storage device 20 of FIG. 1. The following description will emphasize differences between the comparative examples of FIGS. 2 and 3A.

Referring to FIGS. 1, 2 and 3A, the data storage device 20 is assumed to be a log-structured RAID. The log-structured RAID uses an approach wherein data is written to a "new page" instead of a page to which the data was previously stored. Accordingly, unlike the data storage device 20 of FIG. 3A, the data storage device 20 of FIG. 3B writes data to a new page instead of updating (reading, modifying and re-writing) the data to an existing page.

For instance, assuming that data D3, an earlier version of data D3 having been previously written to the first page of the third drive SSD3, is rewritten, an updated version of data D3 (i.e., new data D3') is written to a new page (e.g., the fifth page of the first drive SSD1) instead of the being written to the "old page" (i.e., the first page of the third drive SSD3). In the illustrated example of FIG. 3B, it is assumed that new data D5' and new data D9' have been written to respective new pages (e.g., the fifth page of the second drive SSD2 and the fifth page of third drive SSD3) in relation to old data D5 and old data D9. Parity P3-5-9 corresponding to the new data D3', D5', and D9' may be written to the fifth page of the fourth drive SSD4.

The log-structured RAID described in FIG. 3B effectively reduces the memory cell wear and resulting memory system performance deterioration associated with the read-modify-write approach used by the parity RAID described in FIG. 3A. However, the log-structured RAID must determine the page address for write data without reference to a logical block address. Therefore, a special mapping table is required.

Moreover, the log-structured RAID must perform garbage collection in order to reallocate old pages storing old (and invalid) data in order to create new pages available for use. In this regard, garbage collection may be performed according to a predetermined policy (e.g., when an amount of invalid data exceeds a predetermined limit). Garbage collection may be performed on a stripe basis. For example, if the RAID controller 101 determines that garbage collection for the first stripe STP1 is warranted, then the first pages of the respective first through fourth drives SSD1 through SSD4 are erased.

Figure 4A:
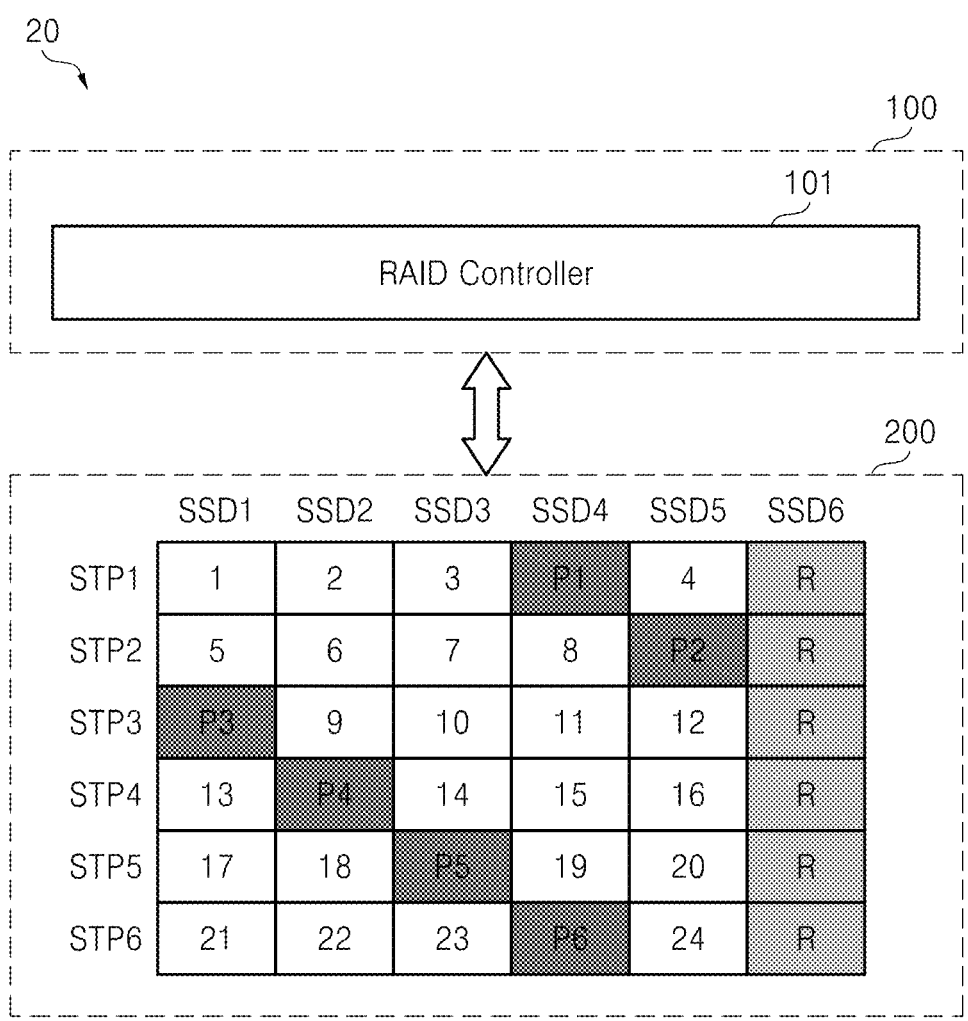
FIGS. 4A, 4B and 4C are respective block diagrams illustrating the operation of a data storage device using a spare disk in a comparative example.
Figure 4B:
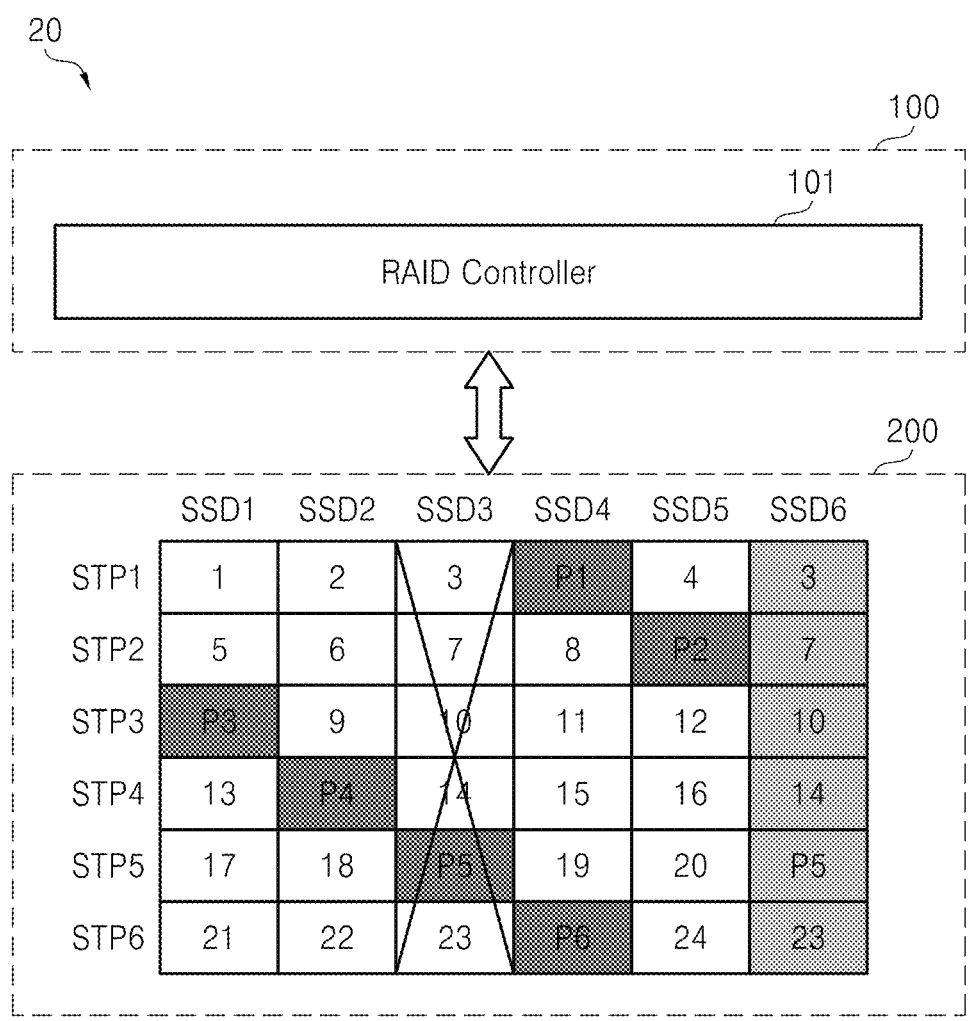
Figure 4C:
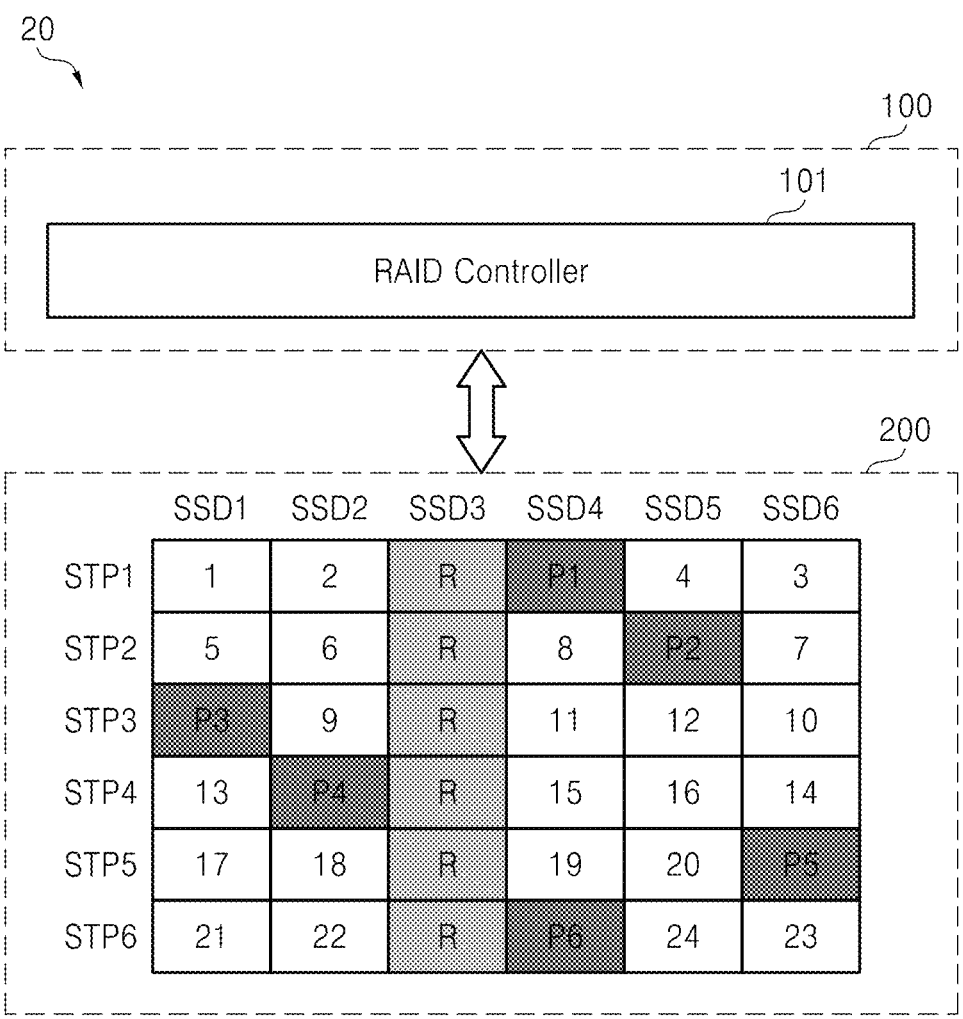

FIGS. 4A, 4B and 4C are respective block diagrams illustrating in a comparative example a data storage device operating in a spare disk mode to recover data. Referring to FIGS. 1 and 4A, the nonvolatile memory 200 is assumed to include six (6) drives SSD1 through SSD6.

Each of the first through six drives SSD1 through SSD6 includes a plurality of pages which store data. In FIGS. 4, 4B and 4C as well as the other illustrated embodiments that follow, a number (#) denotes each page of data, a P# denotes each page of parity, and a R# denotes an empty page.

FIG. 4A shows an initial (assumed) state for the data storage device 20. So long as the data storage device 20 operates normally, the sixth drive SSD6 is left idle and no data and/or parity (hereafter, "data/parity") are stored in the pages of the sixth drive SSD6. In this manner, the sixth drive SSD6 is reserved as a spare disk, while data/parity may be stored in pages of the first through fifth drives SSD1 through SSD5.

FIG. 4B shows a state for the data storage device 20 in which the third drive SSD3 has malfunctioned. After recognizing the malfunction, the RAID controller 101 recovers data pages 3, 7, 10, 14, and 23, as well as parity page P5, stored in the third drive SSD3 by performing an XOR operation on data/parity in each of one of the stripes STP1 through STP6.

The RAID controller 101 may then write the recovered data/parity to the spare disk (e.g., the sixth drive SSD6). Thereafter, when there is a read command directed to a "target page" (i.e., a page identified by the read command as storing desired read data) of the third drive SSD3 is received, the RAID controller 101 redirects the read command to a corresponding "spare disk page" of the sixth drive SSD6 (i.e., a page of recovered data stored in a corresponding page of the sixth drive SSD6). With this redirection of the target page to a corresponding spare disk page, a read operation indicated by the read command may proceed normally.

FIG. 4C shows a state for the data storage device 20 in which the third drive SSD3, following correction of the malfunction (e.g., by replacing or fixing the third drive SSD3), is designated (or assigned) as a new spare disk, essentially replacing the former spare disk, the sixth drive SSD6. Following this designation, the RAID controller 101 will recognize the third drive SSD3 as the spare disk of the nonvolatile memory 200. Accordingly, should another drive malfunction thereafter, the RAID controller 101 may recover data/parity in the manner described above, albeit using the third drive SSD3 as the spare disk.

However, it should be noted that the data storage device 20 operated according to the spare dick mode of FIGS. 4A, 4B and 4C does not store data during normal operations in the designated spare disk. Accordingly, disk use by the RAID controller 101 is inherently unbalanced with some disks bearing a greater data storage/access burden than other disks.

Figure 5A:
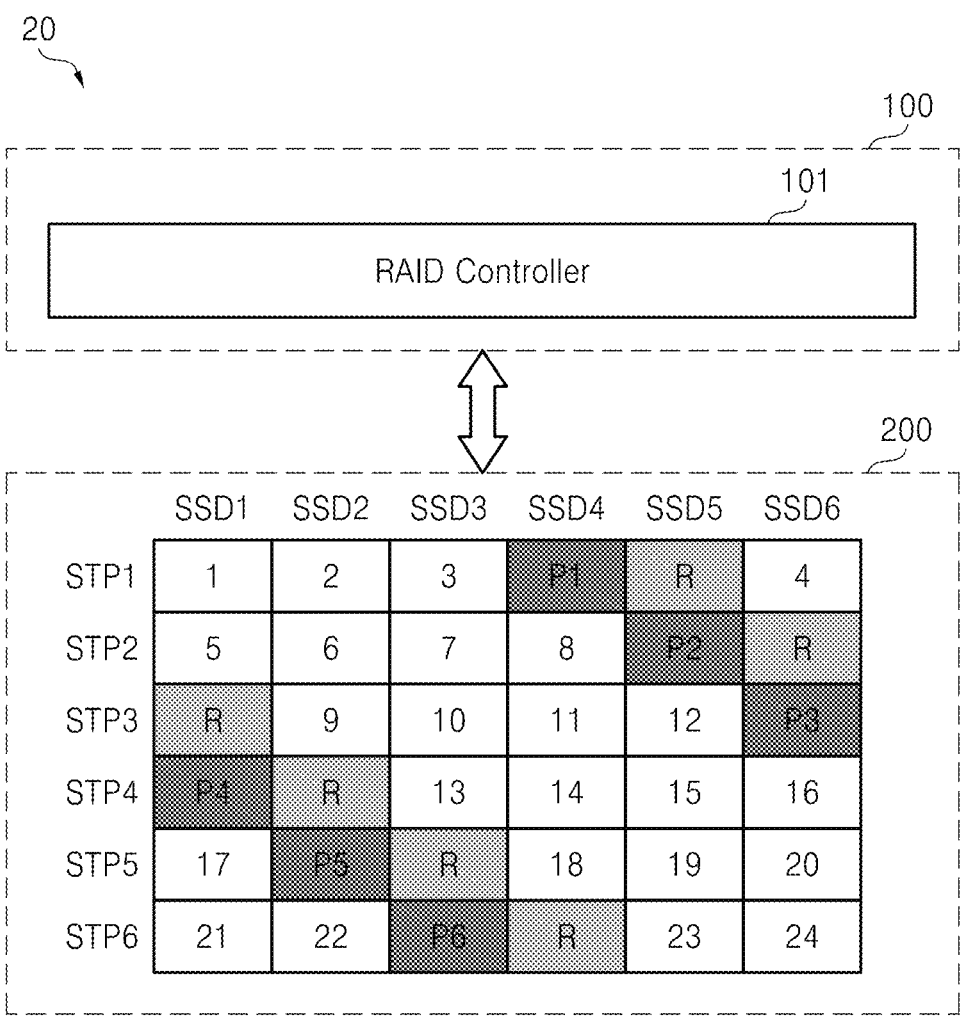
FIGS. 5A, 5B and 5C are respective block diagrams illustrating the operation of a data storage device using a spare region in a comparative example.
Figure 5B:
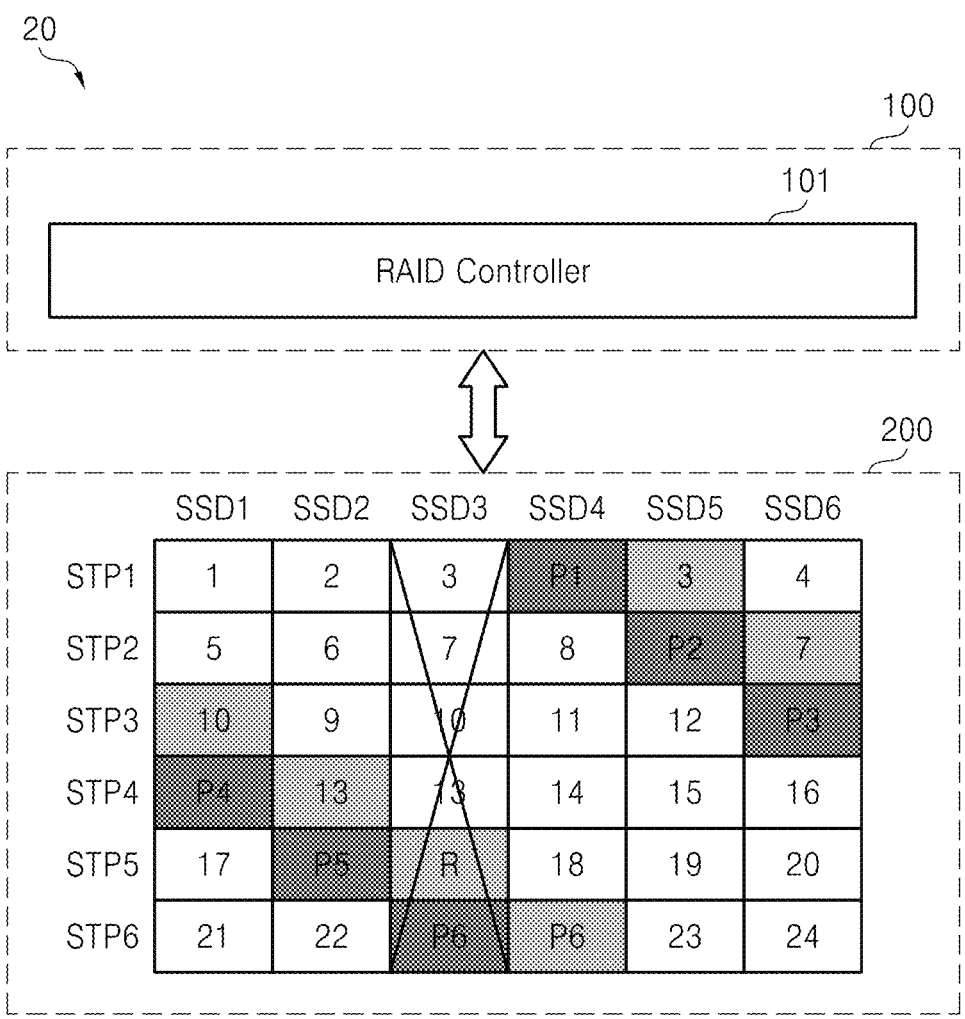
Figure 5C:
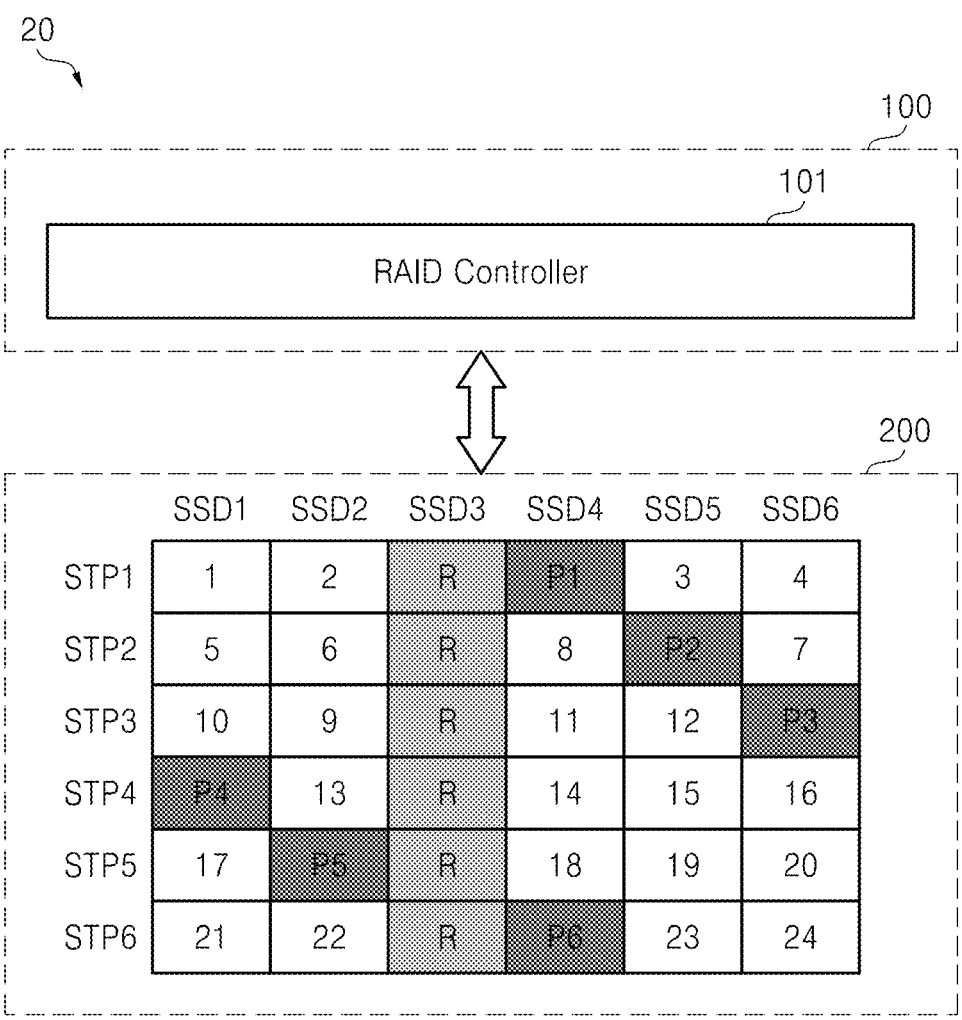

FIGS. 5A, 5B and 5C are respective block diagrams illustrating in another comparative example the operation of the data storage device 20 using a spare region mode. FIGS. 5A, 5B and 5C are respectively analogous to the conditions previously assumed for FIGS. 4A, 4B and 4C. The following description emphasizes differences between the operation of the data storage device 20 in the spare region mode (FIGS. 5A, 5B and 5C) and the operation of the data storage device 20 in the spare disk mode (FIGS. 4A, 4B and 4C).

Unlike data storage device 20 of FIGS. 4A, 4B and 4C, the data storage device 20 of FIGS. 5A, 5B and 5C does not provide a designated spare disk that may be used for data recovery. Instead, spare regions R are distributed across the plurality of drives SSD1 through SSD6 (e.g., one spare region (e.g., a spare page) per drive, as shown in FIG. 5A). Accordingly, data/parity may be stored in any of the non-spare regions (e.g., pages) of the first through sixth drives SSD1 through SSD6.

Upon recognizing a malfunction in the third drive SSD3 (FIG. 5B), the RAID controller 101 recovers data 3, 7, 10, 13 and parity P6 stored in the third drive SSD3 by performing an XOR operation on data/parity in each of one of the stripes STP1 through STP6.

The RAID controller 101 may write the recovered data/parity to the spare regions R. Thereafter, in response to a read command identifying an old page of the third drive SSD3 as a target page, the RAID controller 101 may redirect the read command to a corresponding spare region page storing the recovered data, so that a read operation is normally performed.

FIG. 5C illustrates a state for the data storage device 20 in which the malfunction of the third drive SSD3 has been corrected and recognized by the RAID controller 101, such that the third drive SSD3 operates normally. Then, the RAID controller 101 may designate the third drive SSD3 as a spare disk, or move the data appropriately to reset the spare regions R shown in FIG. 5A or some other distributed arrangement of spare regions R.

The data storage device 20 of FIGS. 5A, 5B and 5C recovers data in the spare region mode in a manner such that data storage/access loads are better balanced across the drives SSD1 through SSD6. However, this load balancing comes at the price of an increased number of data movement operations necessary to reset the spare regions R following correction of a malfunctioning drive. Here again, an increasing number of data access operations required to move data/parity leads to memory cell wear, particularly in non-volatile memories including NAND flash memory cells.

FIGS. 6A, 6B, 6C, 6D, 6E and 6F (collectively, FIGS. 6A through 6F) are respective block diagrams illustrating the operation of the data storage device 20 according to some embodiments of the inventive concept. The memory controller 100 and RAID controller 101 previously described in relation to FIGS. 1 and 2 are assumed for the data storage operation illustrated in FIGS. 6A through 6F.

Referring to FIG. 6A, the nonvolatile memory 200 is again assumed, as a convenient example, to include a plurality of the drives SSD1 through SSD6. FIG. 6A shows an initial state for the data storage device 20. Each of the drives SSD1 through SSD6 is again assumed to include a plurality of pages. Each of the pages is a base unit for a read operation of the data storage device 20 and may store data/parity. The data/parity stored in pages of the drives SSD1 through SSD6 is preferably distributed in a uniform manner (or as uniformly a manner as is reasonably possible).

Here again, the nonvolatile memory 200 is assumed to include a plurality of the stripes STP1 through STP6, where each stripe is a base unit for a recovery operation of a RAID. Each stripe may also be designated as a base unit for a garbage collection operation of a log-structured RAID.

Although each stripe is assumed to be a page row in the embodiments illustrated in FIGS. 6A through 6F, the inventive concept is not thus restricted The pages associated with each stripe are used to derive (or generate) corresponding parity.

State information SI for each stripe (e.g., STP1 through STP6) may be stored in the buffer 300 of the data storage device 20, where the RAID controller 101 uses the state information SI when performing data recovery in the spare region mode, such that the number of data movements is reduced. That is, when the data storage device 20 operates normally, state information SI associated with each of the stripes STP1 through STP6 may indicate a first state CL, as shown in FIG. 6A. The first state CL may indicate a state where data, parity, and empty pages are distributed in the spare region mode.

FIG. 6B shows the state of the data storage device 20 right following an assumed malfunction of the third drive SSD3. Once the RAID controller 101 recognizes the malfunction of the third drive SSD3, it changes the stored state information SI for each stripe from the first state CL to a second state FL. In certain embodiments of the inventive concept, the second state FL may further include information indicating (e.g., using an address) the malfunctioning drive. Thus, assuming that the third drive SSD3 has malfunctioned, the state information SI of each stripe may indicate a third drive-second state or FL3. The address information for the malfunctioning drive is not independently set for each stripe but is shared across the nonvolatile memory 200. Accordingly, the address information indicating a malfunctioning drive may be deemed shared global data.

When a read command directed to the third drive SSD3 is received while the data storage device 20 is operating in the state shown by FIG. 6B, the RAID controller 101 may recover data as described above and transmit recovered data to the host 10, so that a read operation is normally performed.

Figure 6C:
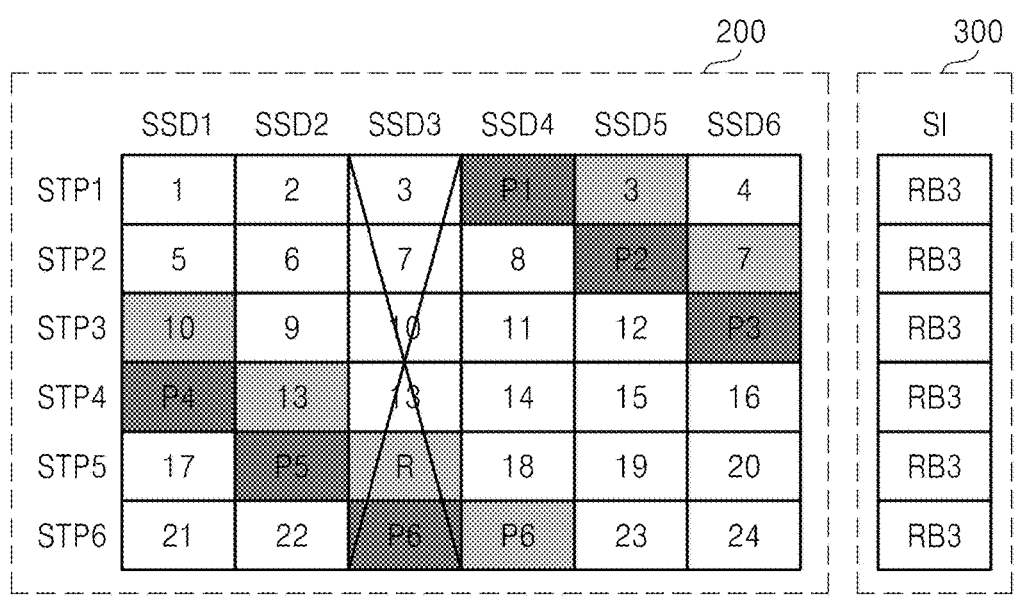

FIG. 6C shows the state of the data storage device 20 following recovery of the data/parity from the malfunctioning third drive SSD3. Here, for example, the RAID controller 101 may recognize the malfunction of the third drive SSD3 and recover data 3, 7, 10, and 13, as well as parity P6 of the third drive SSD3 by performing an XOR operation on data in each stripe.

The RAID controller 101 may then write the recovered data/parity to spare region(s) R and change the state information SI for each stripe from the second state FL3 to a third state RB. When the state information SI indicates the third state RB, the state information SI may include information about the address of the malfunctioning drive. When the third drive SSD3 malfunctions, the state information SI of each stripe may indicate a third drive-third state RB3.

Thereafter, a read command directed to old data/parity pages (e.g., 3, 7, 10, 13 and P6) of the third drive SSD3 will instead be redirected by the RAID controller 101 to a corresponding new data/parity page storing the recovered data/parity, such that the read operation is normally performed.

FIG. 6D shows a state for the data storage device 20 following correction of the third drive SSD3 (e.g., replacement of the malfunctioning drive with a normal SSD). Once the RAID controller 101 recognizes the replacement of the third drive SSD3, the respective regions (e.g., pages) of the replacement third drive SSD3 may be set in an initial state shown in FIG. 6A (e.g., designated as spare regions R), and corresponding state information SI may be changed from the third state RB back to the first state CL. For example, the fifth page of the third drive SSD3 may be designated as a spare region R, and therefore, the RAID controller 101 may change the state information SI for the fifth page of the third drive from the third state RB3 to the first state CL.

FIG. 6E shows a state of the data storage device 20 after garbage collection as been performed on the first stripe STP1. Referring to FIG. 6E, the RAID controller 101 may perform garbage collection, as described above. In order to reduce the number of data movements, however, the RAID controller 101 may move data to the initial positions illustrated in FIG. 6A when performing the garbage collection. This is possible because the garbage collection is performed on each stripe and involves a write operation of data stored in the pages in the stripe.

Referring to FIGS. 6A and 6E, when the RAID controller 101 performs garbage collection on the first stripe STP1, it may move the data 3 from the first page of the fifth drive SSD5 to the first page of the third drive SSD3, and thereafter designate the first page of the fifth drive as a spare region R. Since a write operation is performed on the entire area of each stripe when garbage collection is performed, the RAID controller 101 performs data recovery in the spare region mode without additionally performing a write operation (or data movement).

FIG. 6F shows a state of the data storage device 20 after garbage collection has been performed on all of the stripes STP1 through STP6. Referring to FIG. 6F, when the RAID controller 101 has performed garbage collection on all of the stripes STP1 through STP6, the state information SI of each stripe indicates the first state CL. Since the state of the data storage device 20 illustrated in FIG. 6A is the same as that illustrated in FIG. 6F, the RAID controller 101 has performed data recovery in the spare region mode without additional data movements.

Figure 7A:
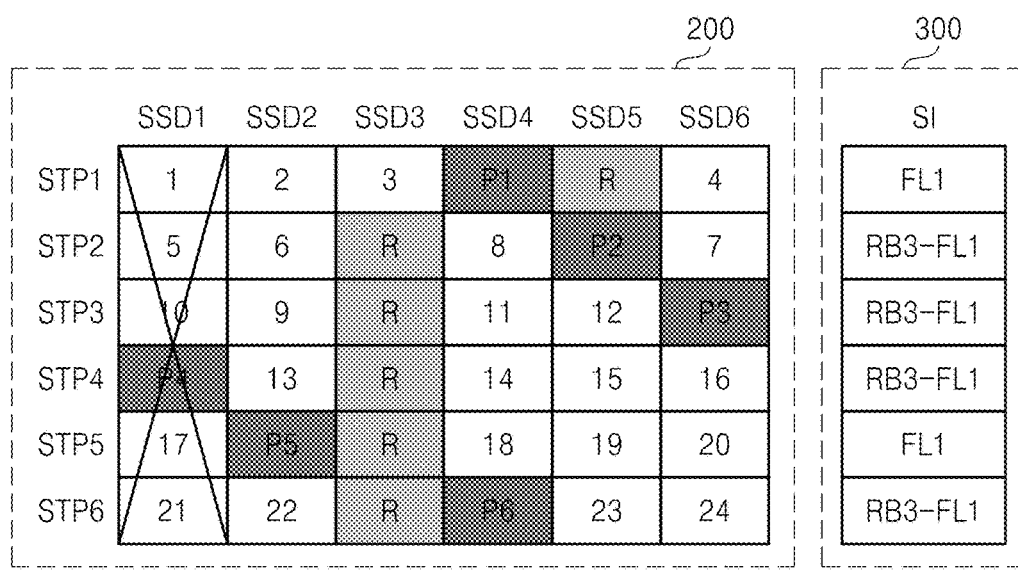

FIGS. 7A and 7B are respective block diagrams illustrating the operation of the data storage device 20 according to other embodiments of the inventive concept. FIG. 7A shows a case where the first drive SSD1 malfunctions while the data storage device 20 is in the state shown in FIG. 6E. Referring to FIG. 7A, when another drive malfunctions before garbage collection has been completed with respect to all of the stripes STP1 through STP6, the RAID controller 101 may change the stored state information SI to recognize the malfunction of another drive. Referring to FIGS. 6E and 7A, the RAID controller 101 may change the state information SI of the first and fifth stripes STP1 and STP5 from the first state to a first drive-second state FL1, as described above.

The RAID controller 101 may add information to the state information SI of a stripe which garbage collection has not been performed. For example, the RAID controller 101 may add the first drive-second state FL1 to the state information SI of the second through fourth stripes STP2 through STP4 and the sixth stripe STP6. Accordingly, the state information SI of the second through fourth stripes STP2 through STP4 and the sixth stripe STP6 becomes a third drive-third state/first drive-second state RB3-FL1.

When a read command directed to the third drive SSD3 (i.e., the first malfunctioned drive) is received under these conditions, the RAID controller 101 may redirect the read command to pages where the recovered data have been stored, so that a read operation is performed normally. When a read command directed to the first drive SSD1 (the second malfunctioned drive) is received, the RAID controller 101 may recover data by performing an XOR operation on data/parity and output the recovered data to the host 10, so that a normal read operation is performed.

The RAID controller 101 may move the spare regions R to the original positions, as described above, to change the state information SI from the third drive-third state/first drive-second state RB3-FL1 to the first drive-second state FL1. At this time, the RAID controller 101 may move data using garbage collection, but the inventive concept is not restricted to only this approach. In other embodiments, the RAID controller 101 may randomly move data.

FIG. 7B shows a state of the data storage device 20 after completion of data movement from the state shown in FIG. 7A. Referring to FIG. 7B, the RAID controller 101 may return spare regions R to the original positions, so that the state information SI of the stripes STP1 through STP6 to the first drive-second state FL1. When the first drive SSD1 is replaced with a normal drive thereafter, the RAID controller 101 may operate as described with reference to FIG. 6B. Accordingly, the RAID controller 101 may perform data recovery in the continuing spare region mode.

FIG. 8 is a block diagram illustrating the operation of the data storage device 20 according to further embodiments of the inventive concept. Referring to FIG. 8, when the performance of the second drive SSD2 degrades temporarily or when the lifetime of the second drive SSD2 needs to be specially extended, the RAID controller 101 may move data stored in the second drive SSD2 to the spare regions R and change the state information SI to a second drive-third state RB2. As the RAID controller 101 move the data and change the state information SI, read and write operations on the second drive SSD2 are restricted until garbage collection is performed and the positions of the spare regions R are changed. Accordingly, the RAID controller 101 may particularly extend the lifetime of the second drive SSD2. The RAID controller 101 may perform this type of specific drive lifetime extension operation when necessary.

FIG. 9 is a flowchart summarizing in one example a method of operating the data storage device 20 according to some embodiments of the inventive concept. Reference is made to the foregoing embodiment as well as FIG. 9. The RAID controller 101 may set the state information SI to the first state CL and the data storage device 20 operates normally in operation S110. The RAID controller 101 may be used to detect the malfunction of one of the drives in operation S120.

When one of the drives malfunctions (S120=YES), the RAID controller 101 may change the state information SI to the second state FL and may perform data recovery for each stripe in operation S130. The data recovery may be carried out by performing an XOR operation on data/parity of the stripe. Thus, when a read request directed to the one (malfunctioning) drive is received from the host 10, the RAID controller 101 may recover data and output the recovered data to the host 10. However, so long as all of the drives operates without malfunction (S120=NO), the data storage device 20 operates normally.

The RAID controller 101 completes the data recovery for each stripe, the RAID controller 101 may change the state information SI of the stripe for which the data recovery is completed to the third state RB in operation S140. Here, if a read request directed to the one (malfunctioning drive) is received from the host 10, the RAID controller 101 redirects or links the read request to drives where the recovered data are stored.

The RAID controller 101 may detect whether malfunction has occurred in another drive in operation S145. So long as malfunction of another drive is not detected (S145=NO), the RAID controller 101 may perform garbage collection on each stripe and may move a spare region in a stripe on which the garbage collection is performed to a predetermined drive in operation S150. The predetermined drive may be a drive where a spare region has initially been placed. The RAID controller 101 may change the state information SI of the stripe whose spare region has been moved to the predetermined drive to the first state CL and may perform a normal operation in operation S160.

However, when malfunction of another drive is detected (S145=YES), the RAID controller 101 may add information indicating the another (malfunctioning) drive to the state information SI of each stripe in operation S170. For instance, when another malfunction occurs in the third drive SSD3 in a state where the state information SI of a stripe has been set to the third state RB3 since the first drive SSD1 has malfunctioned, the RAID controller 101 may set the state information SI of the stripe to a first drive-third state/third drive-second state RB1-FL3.

The RAID controller 101 may perform garbage collection on each stripe and may move a spare region in a stripe on which the garbage collection is performed to a predetermined drive in operation S180. The predetermined drive may be a drive where a spare region has initially been placed. The RAID controller 101 may change the state information SI of the stripe whose spare region has been moved to the predetermined drive and may perform data recovery with respect to the another drive in operation S190. For example, when a spare region is moved to a predetermined position through the garbage collection, the RAID controller 101 may change the state information SI from the first drive-third state/third drive-second state RB1-FL3 to the third drive-second state FL3. After changing the state information SI for all of the stripes, the RAID controller 101 may perform the data recovery in operation S130.

As described above, according to some embodiments of the inventive concept, a data storage device rearranges data using state information and garbage collection without an additional data movement in a spare region mode although a spare disk is inevitably created when a log-structured RAID recovers data in the spare region mode continuously. The data storage device reduces the number of data movement when the log-structured RAID recovers data in the spare region mode, thereby lengthening the lifetime. In addition, the data storage device changes the state information to reduce data movement for a disk whose performance temporarily degrades or perform global wear leveling, so that the lifetime of the data storage device is extended.

While the inventive concept has been particularly shown and described with reference to exemplary embodiments thereof, it will be understood by those of ordinary skill in the art that various changes in forms and details may be made therein without departing from the scope of the inventive concept as defined by the following claims.

What is claimed is:

1. A data storage device comprising:
   a nonvolatile memory arranged according to drives and stripes;
   a buffer configured to store state information of each of the stripes; and
   a memory controller comprising a redundant array of independent disks (RAID) controller configured to operate in a spare region mode and perform data recovery using garbage collection based on the state information,
   wherein the state information includes at least one of a first state indicating that none of the drives has malfunctioned, a second state indicating that a first drive among the drives has malfunctioned, and a third state indicating that data/parity stored in the first drive has been recovered, wherein upon detecting malfunction of the first drive, the RAID controller is further configured to change the state information from the first state to the second state, and wherein the RAID controller is further configured to recover the data/parity stored in the first drive to a spare region of the nonvolatile memory and change state information of a stripe among the stripes including the spare region from the second state to the third state, and to move the recovered data/parity while performing the garbage collection from the spare region to a predetermined drive, and change the state information of the stripe including the spare region from the third state to the first state.

2. The data storage device of claim 1, wherein at least one of the second state and the third state comprises address information indicating the first drive.

3. The data storage device of claim 2, wherein the address information is shared across the drives.

4. The data storage device of claim 2, wherein the RAID controller is further configured to select one of the drives, select one of the stripes, define a page corresponding to the selected drive and the selected stripe as the spare region, and change state information corresponding to the selected stripe to the third state.

5. The data storage device of claim 2, wherein the RAID controller is further configured to select and define one of the drives as a spare disk, and change state information for the spare disk to the third state,
the spare disk comprising at least one spare region in each of the stripes.

6. The data storage device of claim 1, wherein the RAID controller is further configured to recover the data/parity by performing an XOR operation on data/parity stored in at least one of the stripes.

7. The data storage device of claim 1, wherein the RAID controller is further configured to recover parity included in the data/parity by performing an XOR operation on data of the data/parity corresponding to the parity.

8. A redundant array of independent disks (RAID) system comprising:
a data storage device; and
a host configured to communicate with the data storage device,
wherein the data storage device comprises
a nonvolatile memory arranged according to stripes and drives,
a buffer configured to store state information of each of the stripes, and
a memory controller comprising a redundant array of independent disks (RAID) controller configured to operate in a spare region mode and perform data recovery using garbage collection based on the state information,
wherein the state information includes a first state indicating that none of the drives has malfunctioned, a second state indicating a first drive among the drives has malfunctioned, and a third state indicating that data/parity stored in the first drive has been recovered, and wherein upon receiving a request from the host directed to data stored in the first drive and state information for a stripe including the requested data indicates the second state, the data storage device is configured to perform an XOR operation on other data/parity in the stripe including the requested data to recover the requested data and output the recovered requested data to the host.

9. The RAID system of claim 8, wherein upon receiving a request from the host directed to the data stored in the first drive and state information for the stripe including the requested data indicates the third state, the data storage device is configured to link the request from the host to a drive from among the drives in which recovered data is stored.

10. The RAID system of claim 8, wherein at least one of the second state and the third state comprises address information of the first drive.

11. The RAID system of claim 10, wherein the address information is shared across the drives of the nonvolatile memory.

12. A method of operating a data storage device including a nonvolatile memory arranged according to stripes and drives, a buffer storing state information for each of the stripes, and a memory controller including a redundant array of independent disks (RAID) controller operating in a spare region mode and performing data recovery using garbage collection based on the state information, the method comprises:
setting the state information for each of the stripes to a first state indicating none of the drives has malfunctioned;
upon determining that one drive among the drives has malfunctioned, changing the state information for each of the stripes from the first state to a second state indicating that a drive among the drives has malfunctioned;
recovering data/parity of the one drive using spare regions distributed across other drives among the drives and changing the state information for each of the stripes from the second state to a third state indicating that the data/parity of the one drive has been recovered; and
replacing the one drive with a replacement drive and designating regions of the replacement drive as new spare regions.

13. The method of claim 12, further comprising:
after designating the regions of the replacement drive as the new spare regions, performing garbage collection on at least one stripe among the stripes, such that the recovered data/parity stored in one of the spare regions included in the at least one stripe is moved to one of the new spare regions.

14. The method of claim 12, further comprising:
upon determining that another drive among the drives has malfunctioned, changing state information for at least one stripe among the stripes from the third state to a different state indicating that the another drive has malfunctioned.

15. The method of claim 14, wherein the second state and the third state respectively include address information indicating the one drive among the drives, and the different state includes address information indicating the one drive and the another drive among the drives.

* * * * *